June 8, 1965   W. C. BUBNIAK   3,187,805
REGENERATOR SEAL MOUNT
Filed Oct. 4, 1962   2 Sheets-Sheet 1

INVENTOR.
William C. Bubniak
BY
Paul Fitzpatrick
ATTORNEY

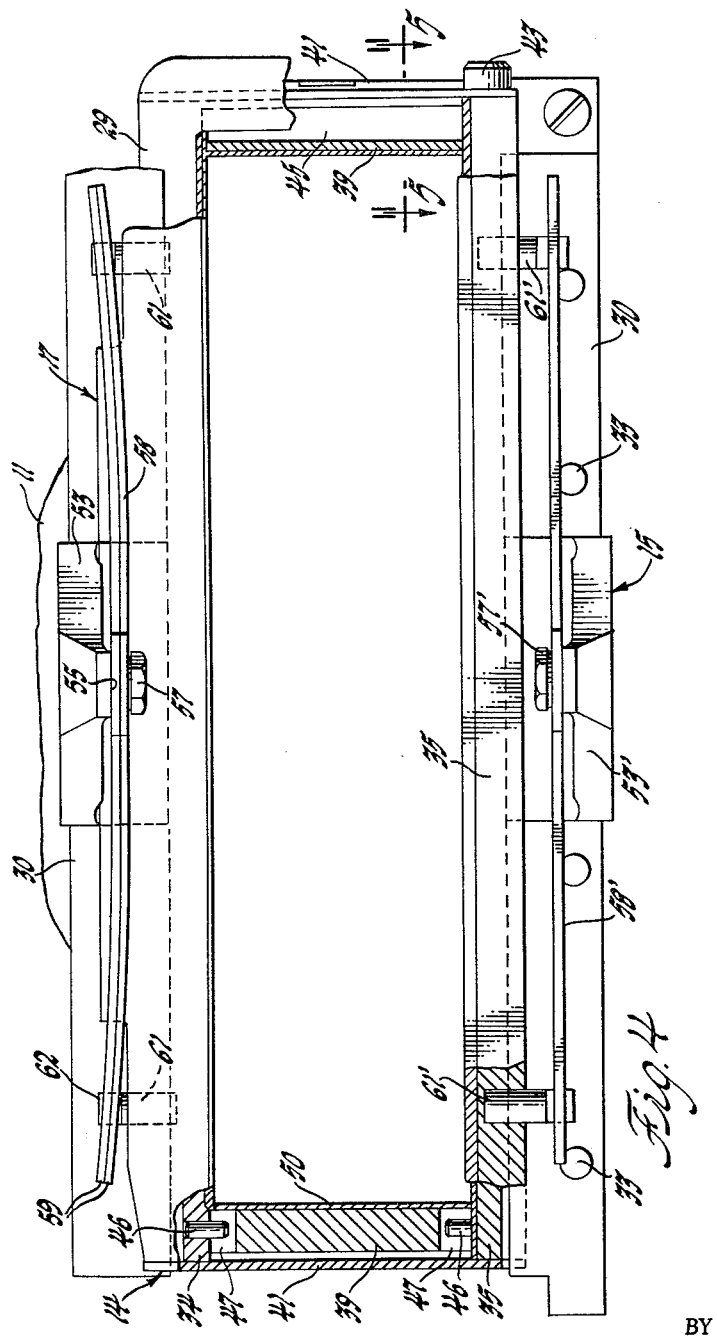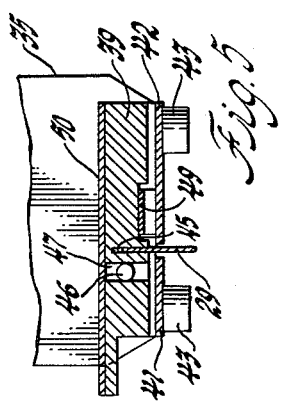

3,187,805
REGENERATOR SEAL MOUNT
William C. Bubniak, Warren, Mich., assignor to General Motors Corporation, Detroit, Mich., a corporation of Delaware
Filed Oct. 4, 1962, Ser. No. 228,458
5 Claims. (Cl. 165—9)

My invention relates to rotary regenerators, that is, devices in which a porous annular body called a matrix rotates slowly so that each part of the matrix passes alternately through two spaces where it is exposed to gases at different temperatures, the matrix carrying heat from the hotter to the cooler gas. In such devices, a seal is provided where the matrix passes from one space to the other to prevent flow of gas from one space to the other. My invention relates particularly to improved means for mounting and guiding such a seal so that friction and wear of the seal are minimized, relatively sliding or rotating parts in the support for the seal are eliminated, and the life of the seal is extended and the efficiency of the engine is preserved by reducing wear in the seal.

The preferred embodiment of the invention described herein is in a regenerator of the radial-flow type having two seals which surrounds the matrix at two points where it passes from one space to the other, such as is described in U.S. Patent 3,057,604 and in U.S. Patents No. 2,888,248. However, it will be clear that the principles of the invention are applicable to regenerators having various structures, including those of the axial-flow type.

The nature of the invention and its advantages will be clear from the succeeding detailed description of the preferred embodiment thereof, with reference to the accompanying drawings.

FIGURE 4 is an elevation view at right angles to FIGURE 2 taken on the plane indicated by the line 4—4 in FIGURE 2.

FIGURE 5 is a detail sectional view taken on the plane indicated by the line 5—5 in FIGURE 4.

Figure 1:
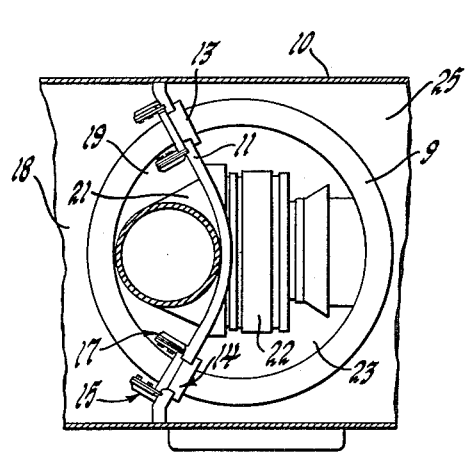
FIGURE 1 is a simplified elevation view of a regenerator installation such as might be included in a gas turbine power plant.

FIGURE 1 may be regarded as a simplified representatation of the application of my invention to a known gas turbine engine which is described in U.S. patent application Serial No. 559,475, filed January 16, 1956 (now abandoned), Serial No. 760,211, filed September 10, 1958, (Patent 3,077,074), and Serial No. 127,079, filed July 13, 1961 (Patent 3,116,605). In such an engine, a regenerator matrix 9 is suitably supported in a housing 10 for rotation so that it passes twice through a bulkhead or diaphragm 11. The housing and diaphragm are the principal elements of the stationary structure of the regenerator. The main seals 13 and 14 surround the matrix where it passes through the diaphragm. The means to support the seals on the diaphragm, which will be described in detail, are indicated at 15 and 17. Approximately one-third of the matrix is to the left of the diaphragm, moving through a space which is divided by the matrix into a cool air zone 18 supplied by the compressor of the engine and a hot air zone 19, to which the air flows through the matrix from zone 18. Combustion chambers in the hot air zone 19 discharge through the transition member 21 into a turbine 22 mounted on the diaphragm. The turbine exhausts into a hot gas zone 23 within the matrix at the other side of the diaphragm, from which the exhaust gas flows through the matrix into an exhaust space 25 from which it is discharged to the atmosephere. All this is well-known and need not be described in detail. The point of my invention is in the seal supports 15 and 17 shown in the remaining figures.

Figure 2:
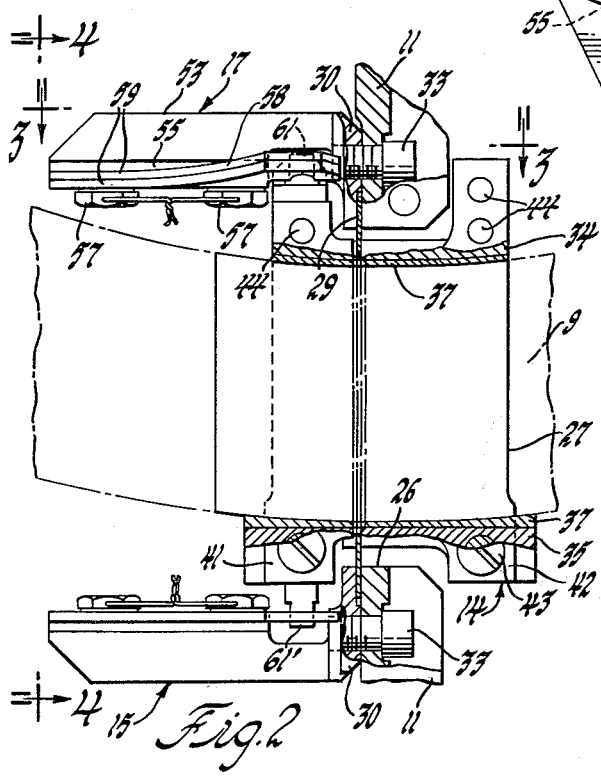
FIGURE 2 is an approxmiately full scale elevation view of a regenerator main seal and its support, with parts cut away, the view being taken in a plane perpendicular to the axis of the matrix.
Figure 3:
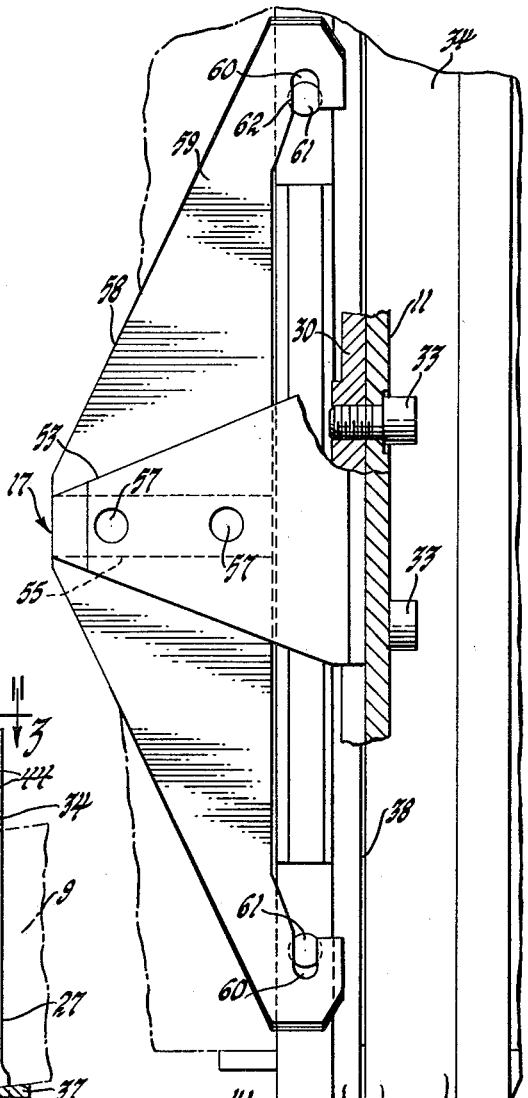
FIGURE 3 is a plan view of the same taken on the plane indicated by the line 3—3 in FIGURE 2.

FIGURES 2 to 5, inclusive, show a main seal 14 and its supports 15 and 17. The diaphragm 11 is provided with an opening 26 through which the matrix 9 passes and within which is mounted the main seal 14, which may be regarded generally as a rectangular frame 27 closely surrounding the matrix. The frame 27 has considerable clearance in the opening 26 to accommodate relative expansion of the matrix and housing. To close this clearance against air flow, a thin flexible sheet metal secondary seal 29 is mounted in a sawcut around the perimeter of the seal 27 and extends into slots in the diaphragm. Specifically, the outer part of secondary seal 29 is received in a clearance between diaphragm 11 and a frame or molding 30 composed of several parts which extend around the opening 26. The seal is somewhat loose in the slots or sawcuts and has clearance at its edges so that the main seal can move vertically as shown in FIGURE 2. The frame 30 is fixed to the diaphragm by socket head machine screws 33.

While the details of the particular main seal 27 illustrated are only somewhat indirectly releated to my invention, it may be desirable to describe them briefly. The main seal 14 comprises an inner seal bar 34 and an outer seal bar 35 engaging respectively the inner and outer surfaces of the matrix 9. These are provided with integral flame sprayed facings 37 of suitable high-temperature cermet bearing material, these faces having cylindrical surfaces ground to conform to the curvature of the matrix. The sawcut 38 across the upper surface of bar 34 to receive the secondary seal 29 is clearly shown in FIGURE 3. The edges of the matrix are engaged by seal blocks 39 which have a floating mounting so that they can be biased against the edges of the matrix and take up any clearance which might otherwise result from relative expansion of the matrix and seal, or from wear. The ends of the seal bars 34 and 35 are connected by a plate 41 to the left of the secondary seal 29 as viewed in FIGURES 2 and 3 and a plate 42 on the other side of the secondary seal. These are fixed by machine screws 43 to the outer seal bar, and by pins 44 to the inner seal bar. The secondary seal 29 extends between the plates 41 and 42, as most clearly shown in FIGURE 5, into a sawcut 45 in the seal block 39. The seal blocks are located circumferentially of the matrix by pins 46 projecting from the seal bars 34 and 35 into slots 47 in the seal blocks 39.

A leaf spring 49 disposed between each plate 42 and block 39 in a radial groove in the latter biases the blocks 39 toward the matrix. Each block 39 has a facing 50 of the bearing material similar to the seal bars. It will be seen, therefore, that the main seal 14 comprises a rectangular frame made up of the seal bars 34 and 35, the plates 41 and 42 joining them at each end, and the end blocks 39 mounted between the seal bars. This assembly fits closely to the matrix so as to minimize leakage of the high pressure air to the low pressure exhaust gas. It slides over the matrix as the latter moves slowly through the diaphragm, and is located and guided by the matrix so far as movement parallel to the matrix axis or radially of the matrix axis are concerned.

My matrix supports permit free movement of the main seal in these directions as required by the matrix. It constrains the main seal against being dragged or pushed with the matrix as it rotates and eliminates any tendency of the main seal to cock or pivot. The supporting structure is quite simple. Considering first the inner support 17, a tapering bracket 53 extends from a portion of the strip 30 which is fixed to the diaphragm 11 by screws 33.

Bracket 53 is integral with a web 55 and is tapped to receive machine screws 57. A cantilever spring 58 made up of two leaves 59 is held against the web 55 by the machine screws 57. As shown most clearly in FIGURE 3, this spring is mounted at its mid-point and tapers towards the outer ends. The outer ends are recurved and the leaves are shaped to define slots 60 which receive pins 61 extending from the inner seal bar 34. The ends of these pins which project into slot 60 are flattened to provide bearing surfaces such as that indicated at 62. The round portion of the pin cannot pass through the slots 60. The slots 60 are deep enough to allow some shifting of the seal in the direction of the axis of the matrix. Movement radially to or from the matrix axis is accommodated by flexure of spring 58 which is accomplished with very slight force in view of the rather long, thin leaves. However, the depth of the leaves circumferentially of the matrix is considerable and they are rigid in this direction to provide a restraining yoke which prevents any significant circumferential movement of the seal. The outer support 15 is essentially identical to the support 17 except that the spring has only a single leaf. Therefore, it will not be described in detail. Parts corresponding to those of the support 17 are identified by the same numbers with the addition of primes.

It will be noted that, as shown in FIGURE 4, the inner double leaf spring is slightly flexed so as to provide a light bias of the seal radially outward of the matrix. The purpose of this is to cause the sliding contact between the matrix and the seal bars to be assumed by one of the seal bars, and particularly by the inner one. The reason for guiding the seal primarily by the inner seal bar is that this is the hot side of the matrix, and friction between the matrix and the preferred bearing material or facing on the seal bars is lower at higher temperatures.

It will be apparent from the foregoing that the seal arrangement of the invention provides for the seal to be guided by the matrix so that friction may be minimized as well as seal clearances, and binding of the seal may be prevented. The seal can shift axially and radially of the matrix to accommodate thermal expansion and any incidential distortion of the matrix. This is accomplished without any relatively rubbing parts such as slides or journals in the means connecting the seal to the fixed part of the regenerator.

The detailed description of the preferred embodiment of the invention for the purpose of explaining the principles thereof is not to be considered as limiting or restricting the invention, since various modifications may be made by the exercise of skill in the art.

I claim:

1. A rotary regenerator comprising, in combination, a stationary structure including a housing and a diaphragm dividing the interior of the housing into first and second chambers, an annular matrix having an axis of rotation supported in the housing for rotation about said axis and passing through the diaphragm, a main seal shiftably mounted in the diaphragm providing an opening for passage of the matrix through the diaphragm and sealing against the matrix where it passes through the diaphragm, means on the matrix and seal cooperating to align the seal with the matrix, and mounting means connecting the seal to said stationary structure so as to fix the seal circumferentially of the matrix and allow it to float radially of the matrix, the connecting means including leaf springs extending generally in the direction of said axis, the springs being thin in the direction radial to the matrix and wide in the direction circumferential of the matrix, each spring being coupled to said stationary structure and to the seal, respectively, at points spaced a sufficient distance apart that the spring is flexible radially of the matrix, the width of the spring circumferentially of the matrix causing it to be rigid circumferentially of the matrix.

2. A regenerator as recited in claim 1 in which the springs are cantilever springs and have at least one loose connection to allow shifting of the seal with respect to the stationary structure in the direction of the axis of the matrix.

3. A regenerator as recited in claim 1 including a spring having a central point fixed to the stationary structure and two ends loosely coupled to the seal.

4. A regenerator as recited in claim 1 including two springs each having a central point fixed to the stationary structure and two ends coupled to the seal by slip connections allowing movement of the seal in the direction of the matrix axis, the matrix passing between the springs.

5. A regenerator as recited in claim 1 in which at least one spring biases the seal lightly so as to provide contact primarily between the seal and the hotter side of the matrix.

References Cited by the Examiner
UNITED STATES PATENTS

| | | | |
|---|---|---|---|
| 3,000,617 | 9/61 | Kitke | 165—9 |
| 3,003,750 | 10/61 | Hess | 165—9 |

CHARLES SUKALO, *Primary Examiner.*